United States Patent [19]
Satake

[11] Patent Number: 5,898,567
[45] Date of Patent: Apr. 27, 1999

[54] PORTABLE INFORMATION APPARATUS WITH HEAT SINK FOR PROMOTING HEAT RADIATION FROM CIRCUIT COMPONENTS

[75] Inventor: Shigeru Satake, Tokyo, Japan

[73] Assignee: Kabushiki Kaisha Toshiba, Kawasaki, Japan

[21] Appl. No.: 08/956,943

[22] Filed: Oct. 23, 1997

[30] Foreign Application Priority Data

Oct. 24, 1996 [JP] Japan .................................. 8-282512

[51] Int. Cl.$^6$ .............................. G06F 1/20; H05K 7/20
[52] U.S. Cl. ...................................... 361/687; 165/104.33
[58] Field of Search .................................. 361/687–693, 361/704, 707–711, 715–722; 165/86, 104.33; G06F 1/20

[56] References Cited

U.S. PATENT DOCUMENTS

| | | | |
|---|---|---|---|
| 5,313,362 | 5/1994 | Hatada et al. ............................ | 361/709 |
| 5,424,913 | 6/1995 | Swindler .................................. | 361/687 |
| 5,588,483 | 12/1996 | Ishida ........................................ | 165/86 |
| 5,598,320 | 1/1997 | Toedtman et al. ....................... | 361/687 |
| 5,634,351 | 6/1997 | Larson et al. ............................ | 361/700 |
| 5,712,762 | 1/1998 | Webb ....................................... | 361/687 |

*Primary Examiner*—Lynn D. Feild
*Attorney, Agent, or Firm*—Finnegan, Henderson, Farabow, Garrett & Dunner, L.L.P.

[57] ABSTRACT

A portable information apparatus, such as a portable computer, comprises a housing having a top wall, a keyboard supported by the top wall, and a display unit rotatably coupled to the housing. The display unit can be rotated between a closed position where it covers the top wall and the keyboard and an opened position where it exposes the top wall and the keyboard. The housing incorporates a circuit component and a heatsink. The circuit component generates heat while operating. The heatsink radiates the heat the circuit component generates. The heatsink has a heat-radiating section exposed along the top wall of the housing. The heat-radiating section is opposed by the display unit, no matter whichever position, including the closed and opened positions, the display unit has been rotated to.

20 Claims, 13 Drawing Sheets

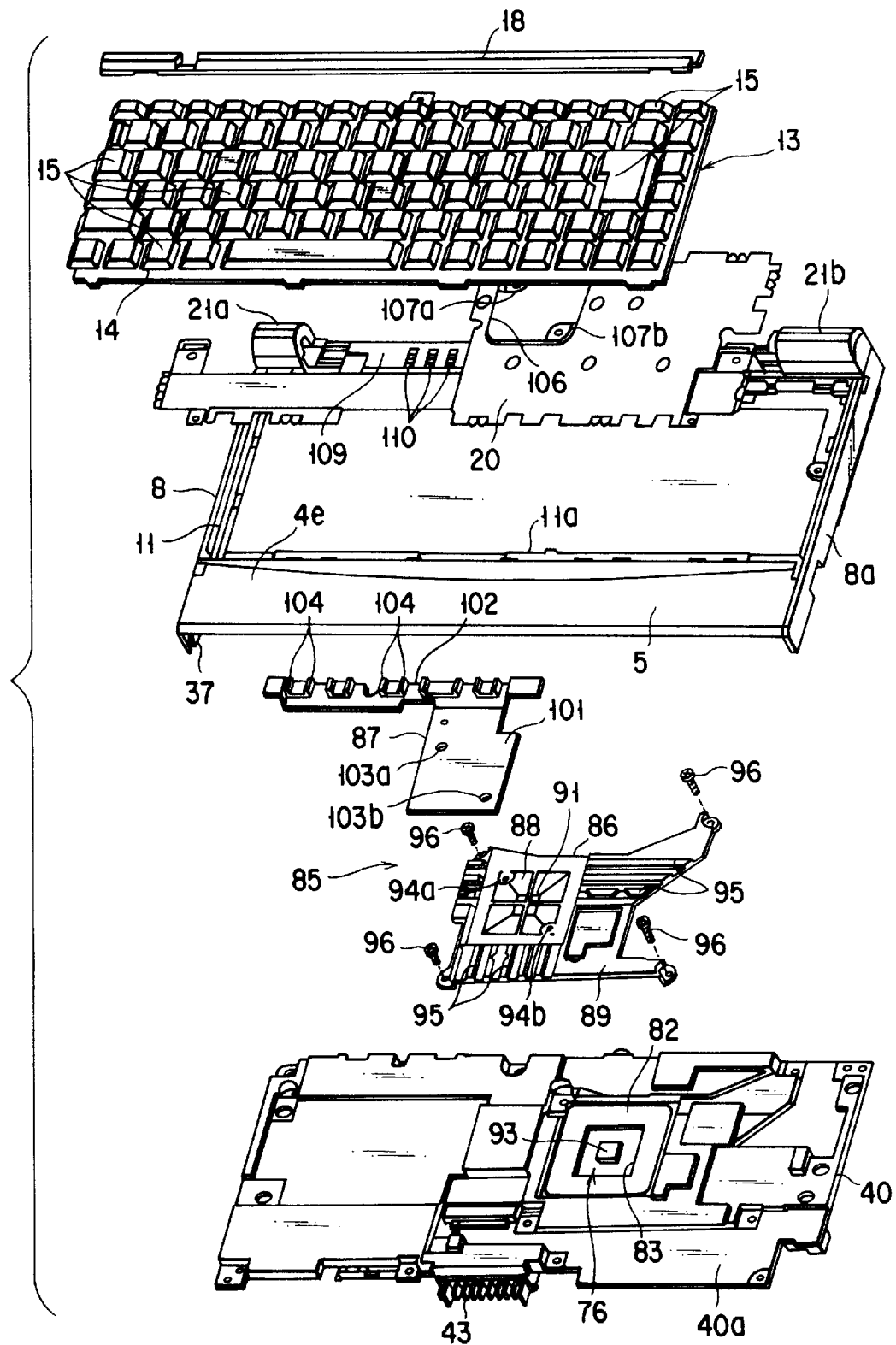
F I G. 2

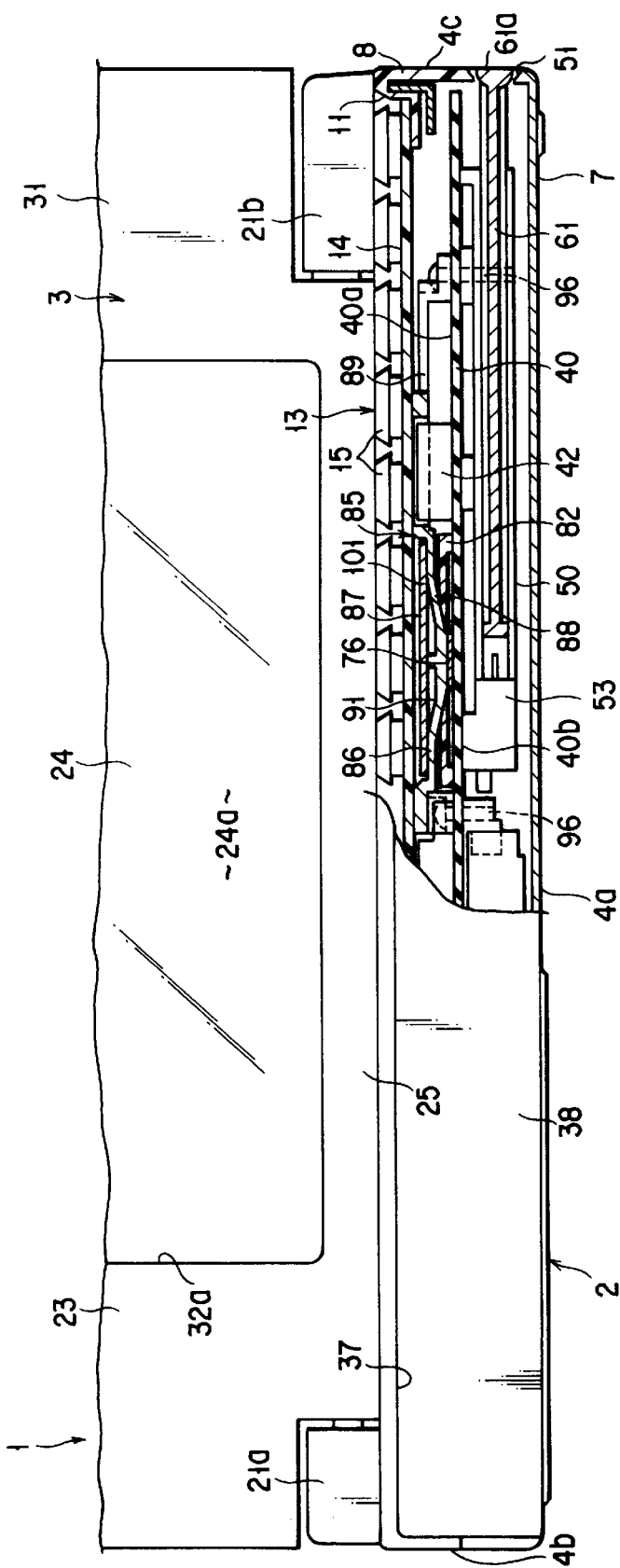
F I G. 5

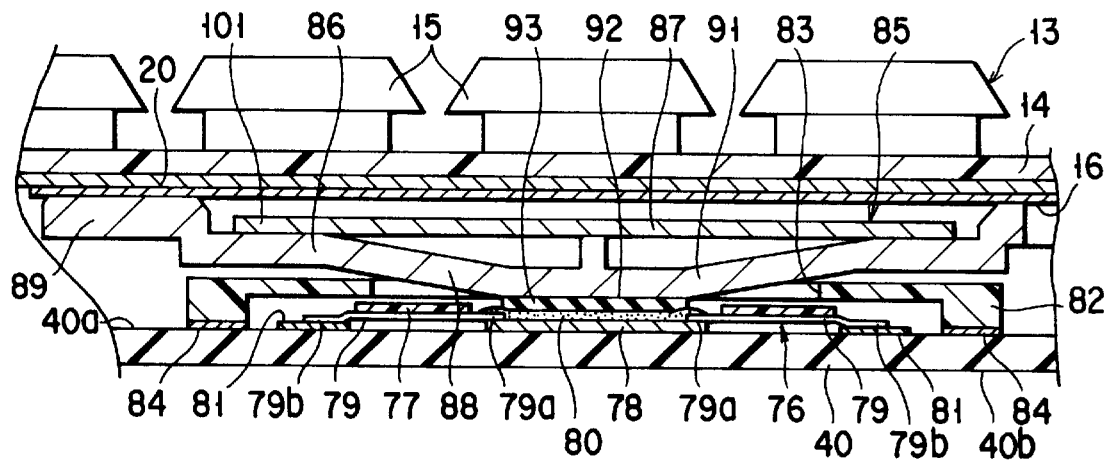
F I G. 6
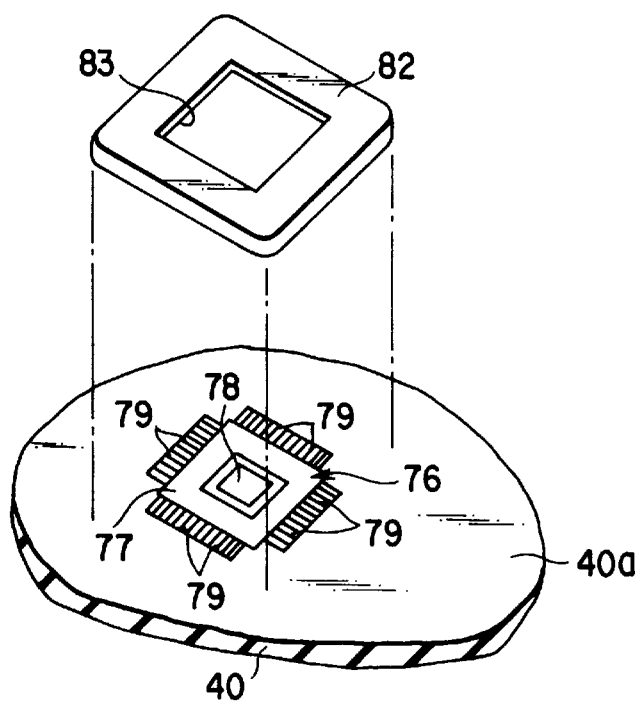
F I G. 7

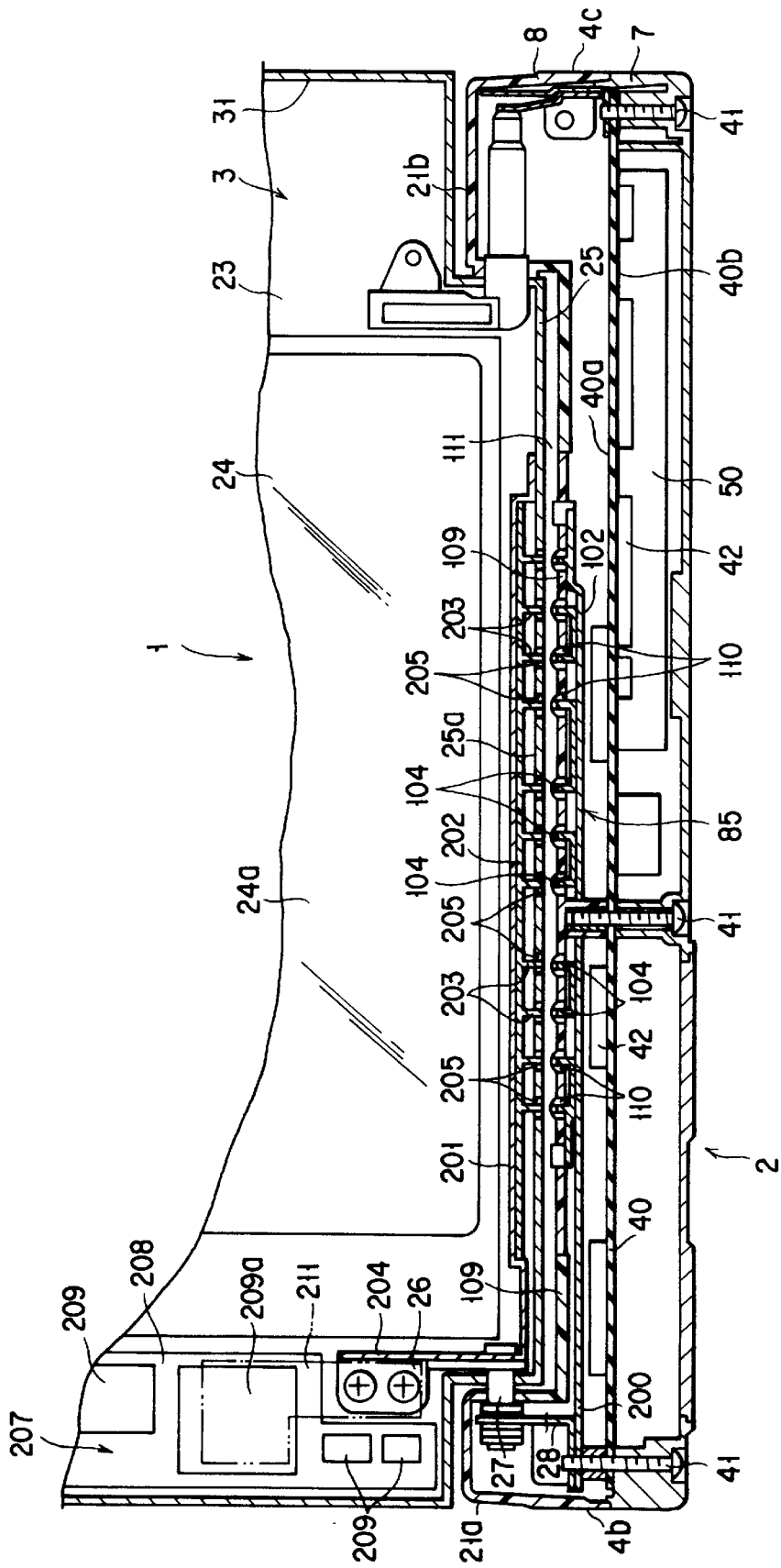
F I G. 11

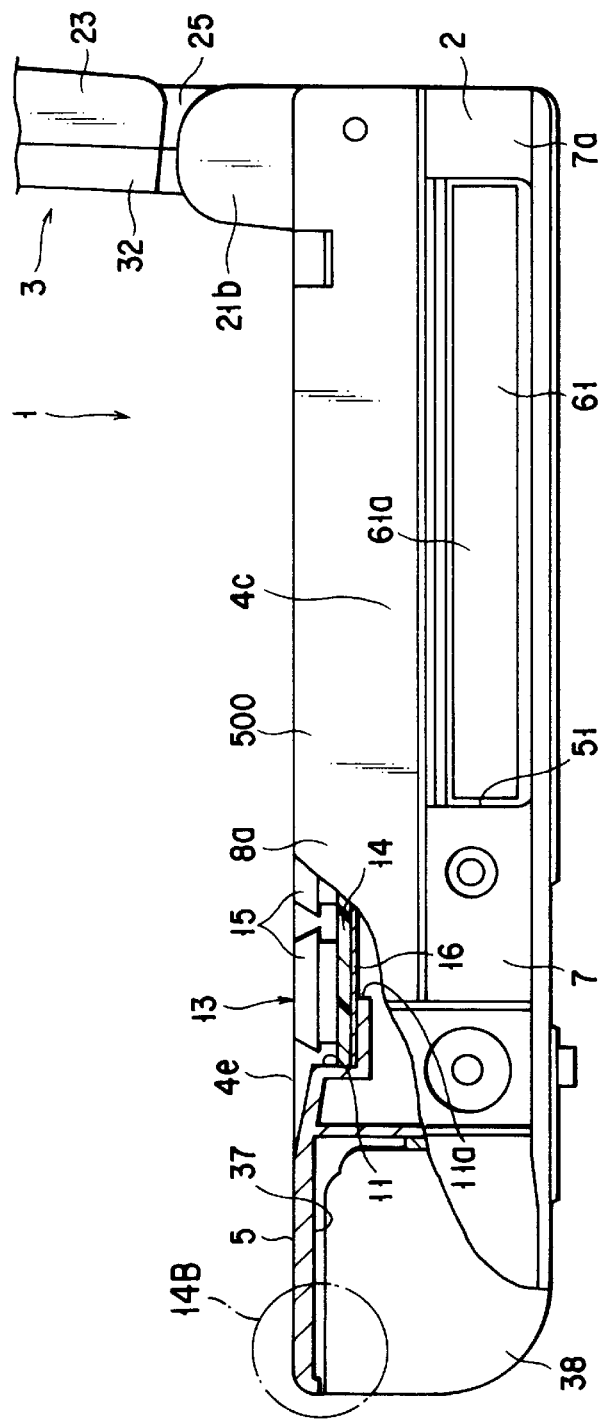
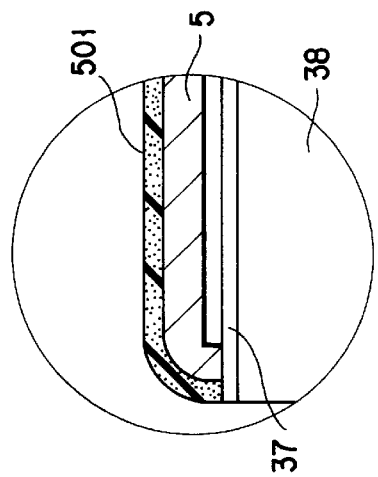
FIG. 14A
FIG. 14B

PORTABLE INFORMATION APPARATUS WITH HEAT SINK FOR PROMOTING HEAT RADIATION FROM CIRCUIT COMPONENTS

BACKGROUND OF THE INVENTION

The present invention relates to a portable information apparatus, such as a portable computer, which has circuit components generating heat while operating, and more particularly to a structure which promotes heat radiation from the circuit components.

Recently book-size and notebook-size portable computers have had their performance greatly improved. There is the tendency that CPUs for use in portable computers are designed to operate at a higher and higher speed. A CPU of this type is provided in the form of a packaged module generally known as "CPU module." The CPU module is mounted on the circuit board incorporated in a computer housing.

The higher the speed with which a CPU processes data, the greater the electric power the CPU consumes. The greater the power it consumes, the more heat the CPU generates. It is necessary to enhance the efficiency of radiating heat from the CPU provided in the computer housing.

A known as a method of promoting heat radiation from a CPU is to attach a heat sink to the circuit board on which the CPU is mounted. The heat sink has a heat-radiating panel which receives the heat the CPU generates. The panel has a number of heat-radiating fins. The panel is contained in the computer housing and positioned almost parallel to the circuit board. In the computer housing, the panel performs natural radiation of the heat transmitted from the CPU to the heat sink.

A computer incorporating a CPU which generates a large amount of heat has an electric fan. The electric fan is located near the heat sink. The fan is started when the temperature ambient to the CPU reaches a predetermined value. While operated, the fan applies cooling air to the heat sink. The cooling air flows along the heat sink and out of the computer housing. The flow of cooling air drives the heat transmitted from the CPU to the heat sink, out of the computer housing.

As indicated above, the heat sink is provided within the computer housing. Hence, the size and shape of the heat-radiating panel and the number of the heat-radiating fins are determined from the amount of heat the CPU generates while operating, in order to raise the efficiency of radiating heat from the CPU. In the case of an electric fan, the rate at which the fan applies the cooling air to the heat sink is increased to enhance the efficiency of radiating heat from the heat sink.

Portable computers recently developed have a housing reduced in size to meet the demand made in the market. There is the trend that the space available in the housing decreases. The space for accommodating the heat sink is inevitably limited. The designer finds it difficult to make the heat sink larger than the present size.

It is demanded that the CPU be improved in performance. Hence, the trend is that the CPU generates an increasing amount of heat while operating. It is now almost impossible for the heat sink to radiate the heat with a sufficient efficiency. The conventional method may fail to radiate the heat sufficiently if the heat the CPU generates increases further. There is a demand for a heat-radiating structure which can radiate the heat generated by the CPU, with a higher efficiency.

The CPU will generates less heat while operating only if its clock frequency is decreased. If the clock frequency of the CPU is lowered, however, the portable computer will have lower performance. This would run counter to the recent demand that the performance of portable computers be improved further.

BRIEF SUMMARY OF THE INVENTION

The present invention has been made in view of the foregoing. Its object is to provide a portable information apparatus having a heat-radiating structure which efficiently radiates the heat generated by circuit components from the housing, which is small to help reduce the size of the housing, and which prevents the heat generated by the circuit components from annoying the operator.

To attain the object, a portable information apparatus according to the invention comprises: a housing having a top wall; input means supported by the top wall, for inputting information when manually operated; a display unit supported to the housing and rotatable between a closed position where the display unit covers the top wall and the input means and an opened position where the display unit exposes the top wall and the input means; a circuit component which is incorporated in the housing and which generates heat while operating; and a heatsink incorporated in the housing, for radiating the heat generated by the circuit component. The heatsink has a heat-radiating section. The heat-radiating section remains exposed along the top wall and opposing the display unit, no matter which position, including the closed and opened positions, the display unit has been rotated to.

While the apparatus is operating, the circuit component generates heat. The heat is transmitted to the heatsink and radiated to the atmosphere. This is because the heat-radiating section of the heatsink is exposed outside the housing. Thus, the heatsink radiates the heat with high efficiency, preventing the circuit component from being heated excessively.

Since the heat-radiating section of the heatsink is exposed outside the housing, no large space needs to be provided in the housing to accommodate the heat-radiating section. The housing can be thin and compact. This contributes to the miniaturization of the information apparatus.

The display unit covers the heat-radiating section of the heatsink no matter whichever position it has been rotated to. The display unit therefore protects the heat-radiating section. The operator never happens to touch the heat-radiating section to have his or her fingers burnt, while operating the input means or holding the apparatus with the display unit set in the closed position.

To achieve the object mentioned above, another portable information apparatus according to this invention comprises: a housing having a top wall; a keyboard mounted on the top wall; a display unit which has a coupling section located at the back of the keyboard and connected to the housing and which is rotatable between a closed position where the display unit covers the top wall and the keyboard and an opened position where the display unit exposes the top wall and the keyboard, the coupling section opposing a rear part of the top wall, no matter whichever position, including the closed and opened positions, the display unit has been rotated to; a circuit board incorporated in the housing; a circuit component which is mounted on the circuit board and which generates heat while operating; and a heatsink incorporated in the housing, for radiating the heat generated by the circuit component. The housing comprises a lower housing made of metal and supporting the circuit board and an upper housing made of synthetic resin, connected to the lower housing and including the top wall. The heatsink has a heat-radiating section exposed to the rear part of the top wall and covered by the coupling section of the display unit.

While the apparatus is operating, the circuit component generates heat. The heat is transmitted to the heatsink and radiated to the atmosphere. This is because the heat-radiating section of the heatsink is exposed outside the upper housing. Thus, the heatsink radiates the heat with high efficiency, preventing the circuit component from being heated excessively.

Since the circuit component is mounted on the circuit board, part of the heat the circuit component generates is dissipated through the circuit board to the lower housing. The heat is diffused in the entire lower housing, which is made of metal superior to synthetic resin in thermal conductivity. The heat hardly accumulates at a particular position in the housing.

Since the heat-radiating section of the heatsink is exposed outside the housing, no large space needs to be provided in the housing to accommodate the heat-radiating section. The housing can be thin and compact. This contributes to the miniaturization of the information apparatus.

The coupling section of the display unit covers the heat-radiating section of the heatsink, no matter which position the display unit has been rotated to. The display unit therefore protects the heat-radiating section. The operator never happens to touch the heat-radiating section. In addition, since the upper housing is made of synthetic resin which is far less thermally conductive than metal, less heat is conducted to the upper housing than to the lower housing. Thus, the upper housing does not become too hot for the operator to touch it when he or she operates the keyboard or holds the apparatus with the display unit set in the closed position.

In order to attain the object described above, still another portable information apparatus according to the invention comprises: a housing having a top wall; operation means supported by the top wall, to be manually operated; a circuit component which is incorporated in the housing and which generates heat while operating; a display unit having a display housing and a liquid crystal display incorporated in the display housing, supported by the housing and rotatable between a closed position where the display unit covers the top wall and the operation means and an opened position where the display unit exposes the top wall and the operation means; a heat-radiating member provided in the display housing; and heat-conducting means for conducting heat from the circuit component to the heat-radiating member. The heat-radiating member has a heat-radiating section exposed along the display housing. The heat-radiating section opposes the top wall, no matter whichever position, including the closed and opened positions, the display unit has been rotated to.

While the apparatus is operating, the circuit component generates heat. Heat-conducting means conducts the heat to the heat-radiating section of the display housing. Since the heat-radiating section is exposed outside the display housing, the heat conducted to the heat-radiating section is radiated to the atmosphere. Therefore, the heat-radiating member radiates the heat with high efficiency, preventing the circuit component from being heated excessively.

Since the heat-radiating member is provided in the display housing, no space needs to be provided in the housing to accommodate the heat-radiating member. In addition, since the heat-radiating section of the heat-radiating member is exposed outside the display housing, no large space needs to be provided in the display housing to accommodate the heat-radiating section. Hence, the housing and the display housing can be thin and compact. This contributes to the miniaturization of the information apparatus.

The top wall of the housing covers the heat-radiating section of the heat-radiating member, no matter whichever position the display unit has been rotated to. The top wall therefore protects the heat-radiating section. The operator never happens to touch the heat-radiating section. Therefore, the upper housing does not become too hot for the operator to touch it when he or she operates the operation means or when holds the apparatus with the display unit set in the closed position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 2 is an exploded view of the portable computer shown in FIG. 1, showing the positional relationship among the TCP, the heat sink and the keyboard;

FIG. 5 is a sectional view, taken along line 5—5 in FIG. 3A;

FIG. 6 is a sectional view, illustrating the positional relationship between the TCP and the heat sink;

FIG. 7 is a perspective view, depicting the positional relationship between the TCP and the lead cover;

FIG. 11 is a sectional view of a portable computer according to a second embodiment of this invention;

FIG. 14A is a side view of a portable computer according to a fifth embodiment of the present invention; and FIG. 14B is an enlarged sectional view of the part 14B shown in FIG. 14A.

DETAILED DESCRIPTION OF THE INVENTION

The first embodiment of the present invention will be described with reference to FIGS. 1 to 10.

Figure 1:
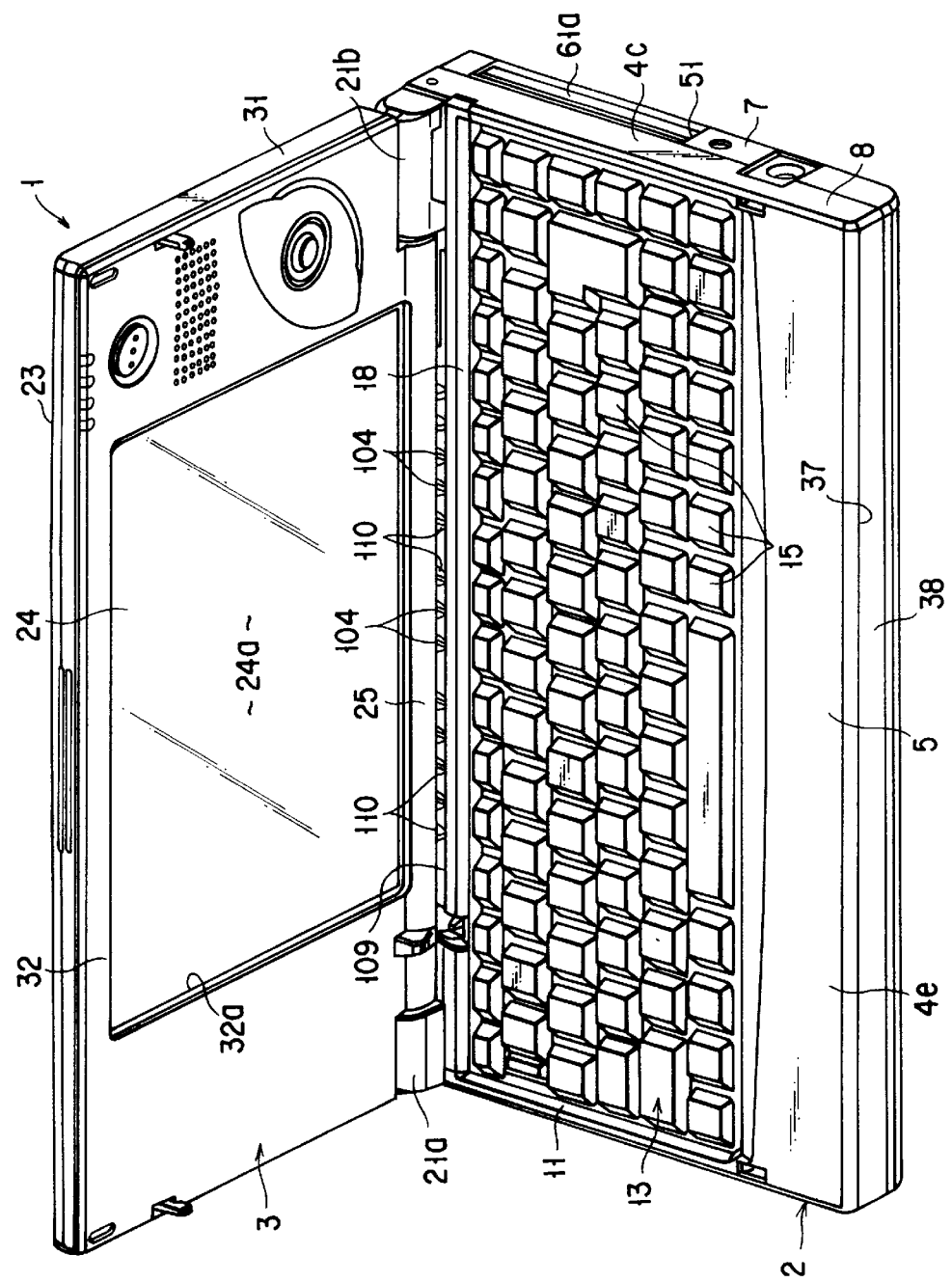
FIG. 1 is a perspective view of a portable computer according to a first embodiment of the present invention.
Figure 3:
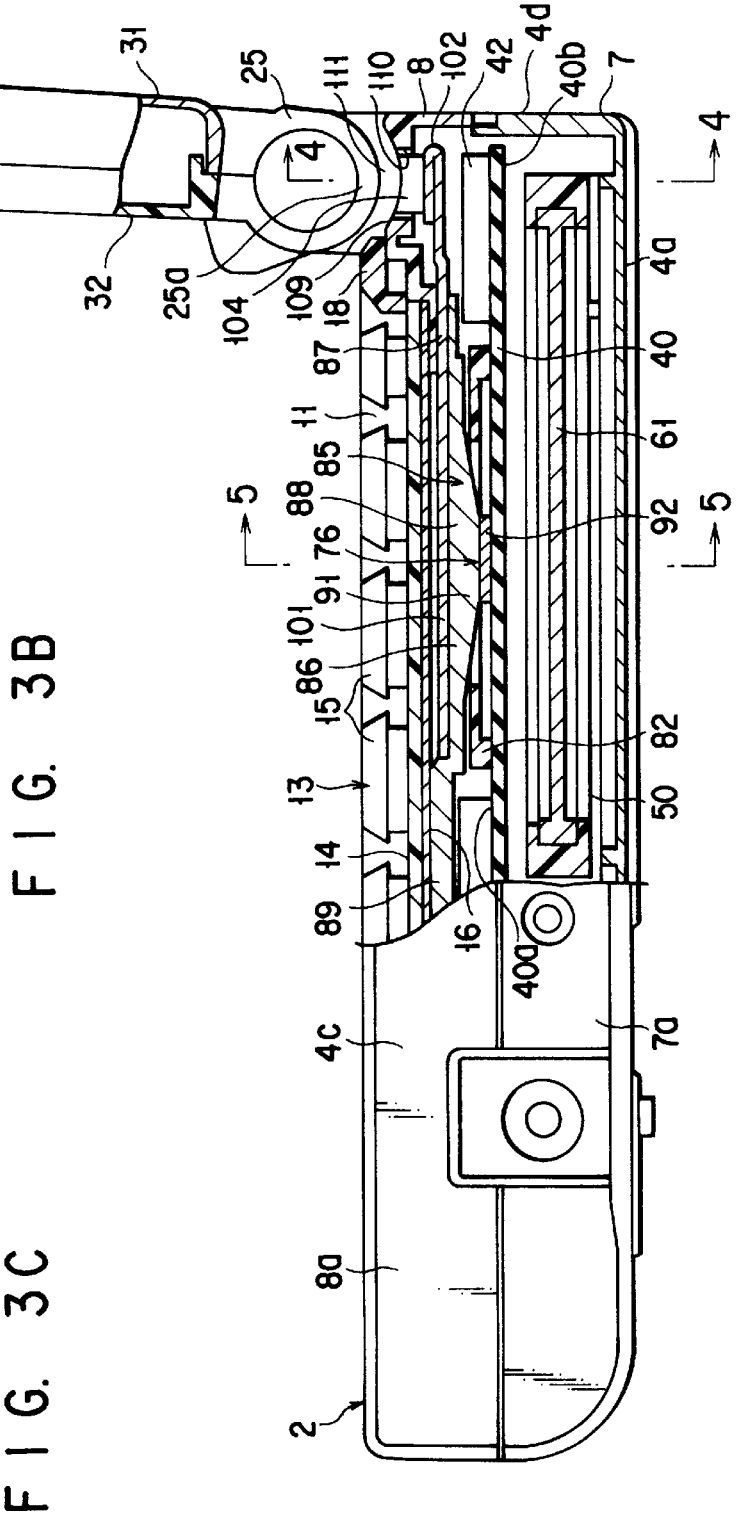
FIG. 3A is a sectional view of the portable computer shown in FIG. 1.
FIG. 3B is a sectional view showing those parts of the lower and upper housings of the computer, which are fastened to each other.
FIG. 3C is a sectional view showing the those parts of the LCD cover and the LCD mask the computer, which are coupled to each other.

FIG. 1 shows a portable computer 1 which is small enough to be put into a suit pocket. The computer 1 comprises a flat box-shaped housing 2 and a display unit 3.

The housing 2 is composed of a flat bottom wall 4a, a pair of side walls 4b and 4c, a rear wall 4d, and a top wall 4e. The side walls 4b and 4c extend upwards from and connected to, the left and right edges of the bottom wall 4a, respectively. The rear wall 4d is extend upwards from and connected to the rear edge of the bottom wall 4a. The top wall 4e extend parallel to the bottom wall 4a, thus opposing the bottom wall 4a. The front part of the top wall 4e serves as palm rest 5, which extends in the widthwise direction of the housing 2.

Figure 4:
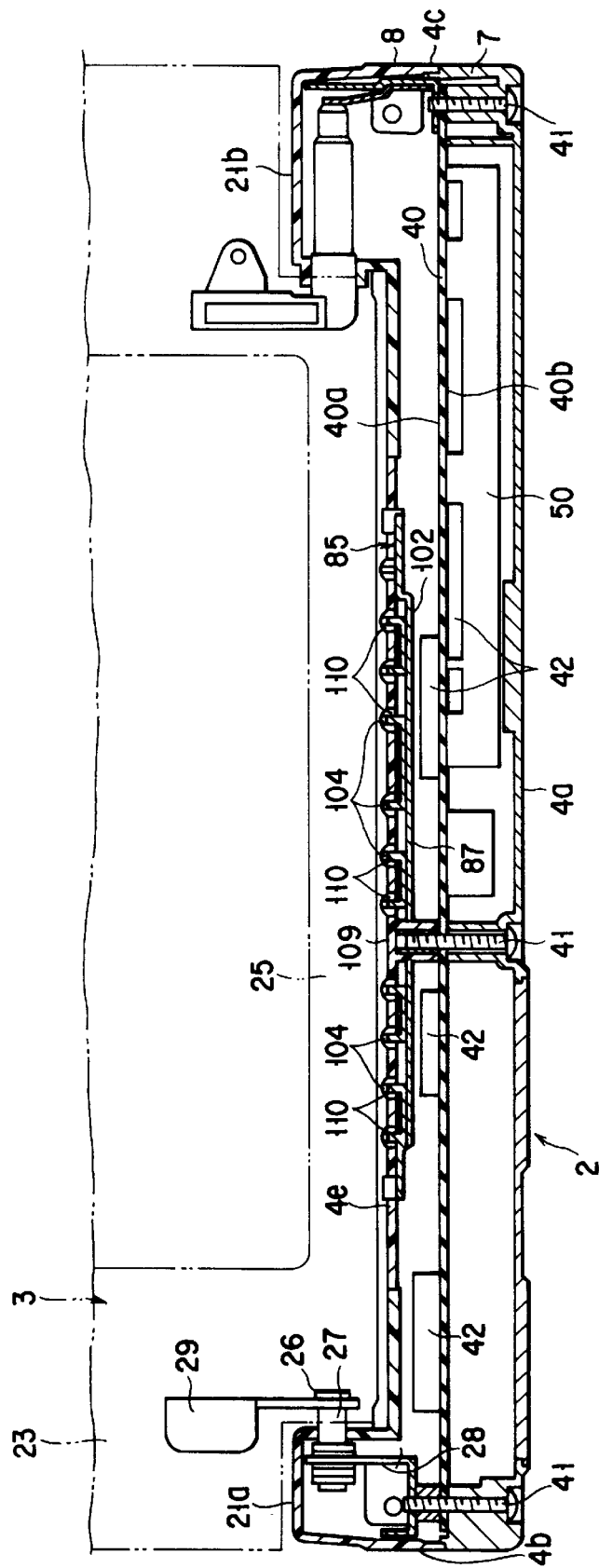
FIG. 4 is a sectional view, taken along line 4—4 in FIG. 3A.

As shown in FIGS. 3A and 4, the housing 2 comprises a lower housing 7 and an upper housing 8. The lower housing 7 is composed of the bottom wall 4a and three walls 7a extending upwards from the left, right and rear edges of the bottom wall 4a, respectively. The upper housing 8 is composed of the top wall 4e and three walls 8a extending downwards from the left, right and rear edges of the top wall 4e, respectively. The upper housing 8 is removably fastened to the lower housing 7. As long as the upper housing 8 remains fastened to the lower housing 7, the walls 7a and the walls 8a are connected, forming the side walls 4b and 4c and rear wall 4d of the housing 2.

The lower housing 7 is made of metal material having thermal conductivity, such as magnesium alloy. It has been made by means of so-called hybrid molding which is a combination of metal die casting and plastic injection molding. The upper housing 8 is made of synthetic resin such as ABS resin. Hence, the lower housing 7 is superior to the upper housing 8 in terms of thermal conductivity.

As shown in FIG. 3B, each wall 7a of the lower housing 7 has its upper edge portion overlapping the lower edge portion of the corresponding wall 8a of the upper housing 8. First claws 9 are formed integral with the upper edge portion of each wall 7a and spaced apart in the longitudinal direction of the wall 7a. Similarly, claws 10 are formed integral with the lower edge portion of each wall 8a. The claws 10 are spaced apart in the lengthwise direction of the wall 8a, thus opposing the first claws 9, respectively.

Since the upper housing 8 is made of synthetic resin, the walls 8a, each having the claws 10, can be elastically bent toward and away from the walls 7a of the lower housing 7. When the upper housing 8 is forced onto the lower housing 7, the walls 8a are elastically deformed at their upper edge portions. The claws 10 therefore go into engagement with the claws 9 formed integral with the walls 7a of the lower housing 7. As a result, the lower housing 7 and the upper housing 8 are fastened to each other, constituting the flat box-shaped housing 2.

As seen from FIG. 2 and described above, the front part of the top wall 4e of the upper housing 8 serves as the palm rest 5. Almost all remaining part, or the rear part, of the top wall 4e serves as a keyboard mount portion 11. The keyboard mount portion 11 has a rectangular opening 11a. The opening 11a allows an access to the interior of the housing 2.

Mounted on the keyboard mount portion 11 is a keyboard 13 which inputs information when manually operated. The keyboard 13 comprises a panel 14, keys 15 and a reinforcing plate 16. The panel 14 is rectangular, made of synthetic resin and fitted in the keyboard mount portion 11. The keys 15 are arranged on the panel 14. The plate 16 is made of metal having high thermal conductivity, such as aluminum alloy, and is laid on the lower surface of the panel 14.

The panel 14a and the reinforcing plate 16 are held in place, with their front edges removably secured to the inner surface of the front edge of the keyboard mount portion 11 and their rear edges fastened to the inner surface of the mount portion 11 by screws (not shown). The keyboard 13 is thereby removably attached to the keyboard mount portion 11, covering the opening 11a thereof.

A cover 18 is removably attached to the rear edge of the keyboard mount portion 11. The cover 18 is shaped like a rod, extending in the widthwise direction of the upper housing 8. It is located between the rearmost row of keys 15 on the panel 14 and the rear edge of the keyboard mount portion 11. Thus located, the cover 18 covers the screws which fasten the keyboard 13 to the upper housing 8.

A metal shield 20 is provided on the reinforcing plate 16 of the keyboard 13 and is located in the opening 11a of the keyboard mount portion 11. So located, the shield 20 prevents the switching noise generated as the keys 15 are operated, from leaking into the housing 2.

As shown in FIGS. 1 and 4, a pair of display-holding sections 21a and 21b are provided on the rear end of the top wall 4e. The sections 21a and 21b are spaced apart at the back of the keyboard 13, in the widthwise direction of the housing 2.

The display unit 3 comprises a flat box-shaped display housing 23 and a color liquid crystal display 24 incorporated in the display housing 23. The display housing 23 has a coupling section 25 at its lower edge, which extends in the widthwise direction of the housing 2. The coupling section 25 is located between the display-holding sections 21a and 21b. The section 25 covers the rear end of the top wall 4e of the housing 2, from above. The section 25 has a distal end part 25a, which is arcuate. The section 25 has its left end connected to the housing 2 by a hinge device 26 made of metal.

As illustrated in FIG. 4, the hinge device 26 comprises a shaft 27 and two brackets 28 and 29. The shaft 27 extends horizontally between the left display-holding sections 21a and coupling section 25. The shaft 27 consists of a first part inserted in the left display-holding section 21a of the housing 2 and a second part inserted in the coupling section 25 of the display housing 23. The first bracket 28 is rotatably coupled to one end of the shaft 27, located in the housing 2 and fastened to the lower housing 7 by screws 41. The second bracket 29 is fixed to the other end of the shaft 27, located in the display housing 23 of the display unit 3 and fastened to the display housing 23 by screws.

Thus supported on the housing 2, the display unit 3 can rotate around the shaft 27 of the hinge device 26, between a closed position and an opened position. While placed in the closed position, the unit 3 covers the palm rest 5 and the keyboard 13. While placed in the opened position, the unit 3 stands upright at the back of the keyboard 13, exposing the palm rest 5 and the keyboard 13.

As seen from FIGS. 1 and 3A, the display housing 23 of the display unit 2 comprises an LCD cover 31 and an LCD mask 32. The LCD cover 31 holds the color liquid crystal display 24. The LCD mask 32 has a rectangular opening 32a. A screen 24a of the display 24 is exposed through the opening 32a.

The LCD cover 31 is made of metal material having thermal conductivity, such as magnesium alloy. Like the lower housing 7, the cover 31 has been made by means of hybrid molding, i.e., a combination of metal die casting and plastic injection molding. The LCD mask 32 is made of synthetic resin such as ABS resin.

The mask 32 is removably attached to the LCD cover 31. As shown in FIG. 3C, the LCD cover 31 and the LCD mask 32 abut on each other at peripheries. First claws 33 are formed integral with the periphery of the LCD cover 31 and spaced apart from one another. Second claws 34 are formed integral with the periphery of the LCD mask 32 and spaced apart from one another. Since the LCD mask 32 is made of synthetic resin, its peripheral edge and the claws 34 can be elastically deformed. Therefore, when the LCD mask 32 is forced onto the LCD cover 31, the peripheral edge of the LCD mask 32 is elastically deformed, whereby the claws 34 therefore go into engagement with the claws 33 formed integral with the LCD cover 31. The LCD cover 31 and the LCD mask 32 are thereby fastened together, constituting the flat box-shaped display housing 23.

As FIG. 1 shows, the housing 2 has a battery receptacle 37. The battery receptacle 37 is located below the palm rest 5 and extends in the widthwise direction of the housing 2. The receptacle 37 is generally an elongated box which opens at the top and front. Removably set in the receptacle 37 is a battery pack 38. The battery pack 38 is used to drive the computer 1 when the computer 1 is used in a place where no commercial AC power supply is available.

As shown in FIGS. 3A, 4 and 5, a circuit board 40 is provided in the housing 2. The circuit board 40 is secured to the bottom wall 4a of the lower housing 7 by screws 41. The board 40 is located below the keyboard 13, extending substantially parallel to the bottom wall 4a. The circuit board 40 has an upper surface 40a and a lower surface 40b. Mounted on the upper surface 40a and the lower surface 40b are various circuit components 42 (including a DRAM). As shown in FIG. 2, a battery connector 43 is mounted on the front central part of the lower surface 40b. The battery connector 43 is exposed to the battery receptacle 37. The battery pack 38 is removably connected to the battery connector 43.

As shown in FIGS. 3A, 4 and 5, a card receptacle 50 is provided in the housing 2, for holding an extension card (not shown) such as a PCMCIA (Personal Computer Memory Card International Association) card. More precisely, the card receptacle 50 is located in the right half of the housing 2, between the lower surface 40b of the circuit board 40 and the bottom wall 4a of the lower housing 7. The receptacle 50 has a card slot 51 and a card connector 53. The slot 51 is made in the right side wall 4c of the housing 2, for guiding the extension card into and out of the card receptacle 50. The card connector 53 is mounted on the lower surface 40b of the circuit board 40 and opposes the card slot 51.

The card receptacle 50 opens to the outside via the card slot 51. A slot-closing member 61 closes the card slot 51 as long as the extension card remains outside the card receptacle 50. The member 61 shaped like the extension card and removably inserted into the card receptacle 50 through the card slot 51. The member 61 has slot-closing wall 61a at the front edge. The wall 61a keeps closing the card slot 51 and is exposed to the outside through the slot 51, as long as the member 61 remains in the card receptacle 50.

As illustrated in FIGS. 3A and 5, a TCP (Tape Carrier Package) 76, which is a circuit component, is mounted on the upper surface 40a of the circuit board 40. The TCP 76 functions as the CPU of the computer 1. The faster the computer 1 operates, the more power the TCP 76 will consume. The more power it consumes, the more heat the TCP 76 will generate.

As seen from FIGS. 6 and 7, the TCP 76 comprises a carrier 77, an IC chip 78, and a number of leads 79. The carrier 77 is made of soft resin film and is square, having four sides. The IC chip 78 is mounted on the center part of the carrier 77; it generates heat while operating. The leads 79 are made of copper foil, each having a first end 79a and a second end 79b. The first end 79a of each lead 79 is soldered to a bump on the IC chip 78. The lead-bump junctions are covered with a layer 80 of potting resin. The second ends 79b of the leads 79 extend outwards from the four sides of the carrier 77.

The TCP 76 assumes a so-called "face-up position" with respect to the circuit board 40. In other words, it is positioned, with lead-bump junctions facing away from the circuit board 40. A number of pads 81 are formed on the upper surface 40a of the circuit board 40. The pads 81 are soldered to the second ends 79b of the leads 79, respectively.

As shown in FIG. 7, a lead cover 82 made of synthetic resin is laid on the upper surface 40a of the circuit board 40. The cover 82 protects the junctions between the pads 81, on the one hand, and the second ends 79b of the leads 79, on the other hand. The cover 82 is fixed to the upper surface 40a of the circuit board 40 by adhesive tape 84. The lead cover 82 has an opening 83 in its center part. The opening 83 is aligned with the IC chip 78. The IC chip 78 has its upper surface exposed through the opening 83.

As FIGS. 2 and 5 show, a heatsink 85 is mounted on the upper surface 40a of the circuit board 40, for promoting heat radiation from the TCP 76. The heatsink 85 is located right above the TCP 76. It is made of metal having high thermal conductivity, such as aluminum alloy or copper-based alloy.

The heatsink 85 comprises a cold plate 86 and a heat-dissipating plate 87 connected to the cold plate 86. The cold plate 86 is positioned below the shield plate 20. The shield plate 20 is larger than the cold plate 86. As seen from FIG. 8, the cold plate 86 has a heat-receiving section 88 and a heat-dissipating section 89 which is connected the section 88.

As shown in FIGS. 2 and 6, the heat-receiving section 88 is square and has substantially the same size as the lead cover 82. The section 88 has two screw holes 94a and 94b made in two corners diagonal to each other. The heat-receiving section 88 opposes the TCP 76 through the opening 83. A pyramidal projection 91 is formed on the lower surface of the heat-receiving section 88 and projects toward the IC chip 78. The projection 91 has a flat top, or a heat-receiving surface 92. The heat-receiving surface 92 has the same size as the IC chip 78. A rubber-like elastic layer 93 is interposed between the IC chip 78 and the heat-receiving surface 92. Therefore, the heat the IC chip 78 generates when operating is transmitted via the layer 93 to the heat-receiving section 88.

Figure 8:
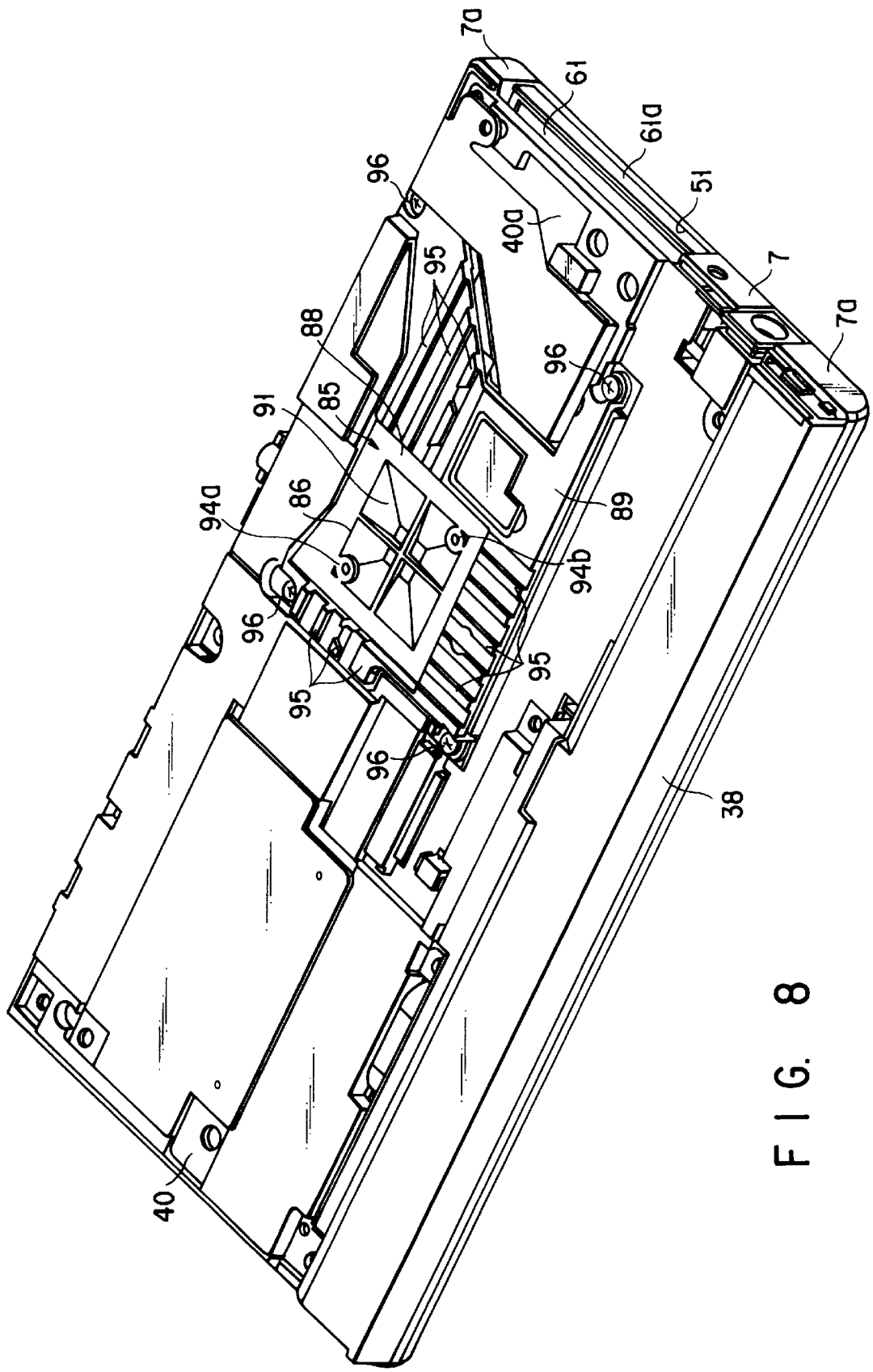
FIG. 8 is a perspective view of the portable computer, showing the lower housing and the circuit board having a cold plate.

As shown in FIG. 8, the heat-dissipating section 89 of the cold plate 86 extends to the front and both sides of the heat-receiving section 88. The section 89 is arranged substantially in parallel to the circuit board 40. Heat-radiating fins 95 are formed integral with the section 89 and arranged on the upper surface thereof. The heat-radiating fins 95 contact the lower surface of the metal shield 20 at their tops.

The section 89 has its left and right ends secured to the upper surface 40a of the circuit board 40 by means of screws 96. The cold plate 86 is thereby held on the circuit board 40. Thus, the TCP 76 and the cold plate 86 are set in precise positional relationship on the upper surface 40a of the circuit board 40.

As FIGS. 5 and 6 show, the heat-dissipating plate 87 of the heatsink 85 is provided between the keyboard 13 and the cold plate 86. As seen from FIG. 9, the heat-dissipating plate 87 has a first heat-conducting section 101 and a second heat-conducting section 102. The sections 101 and 102 are formed integral with each other.

Figure 9:
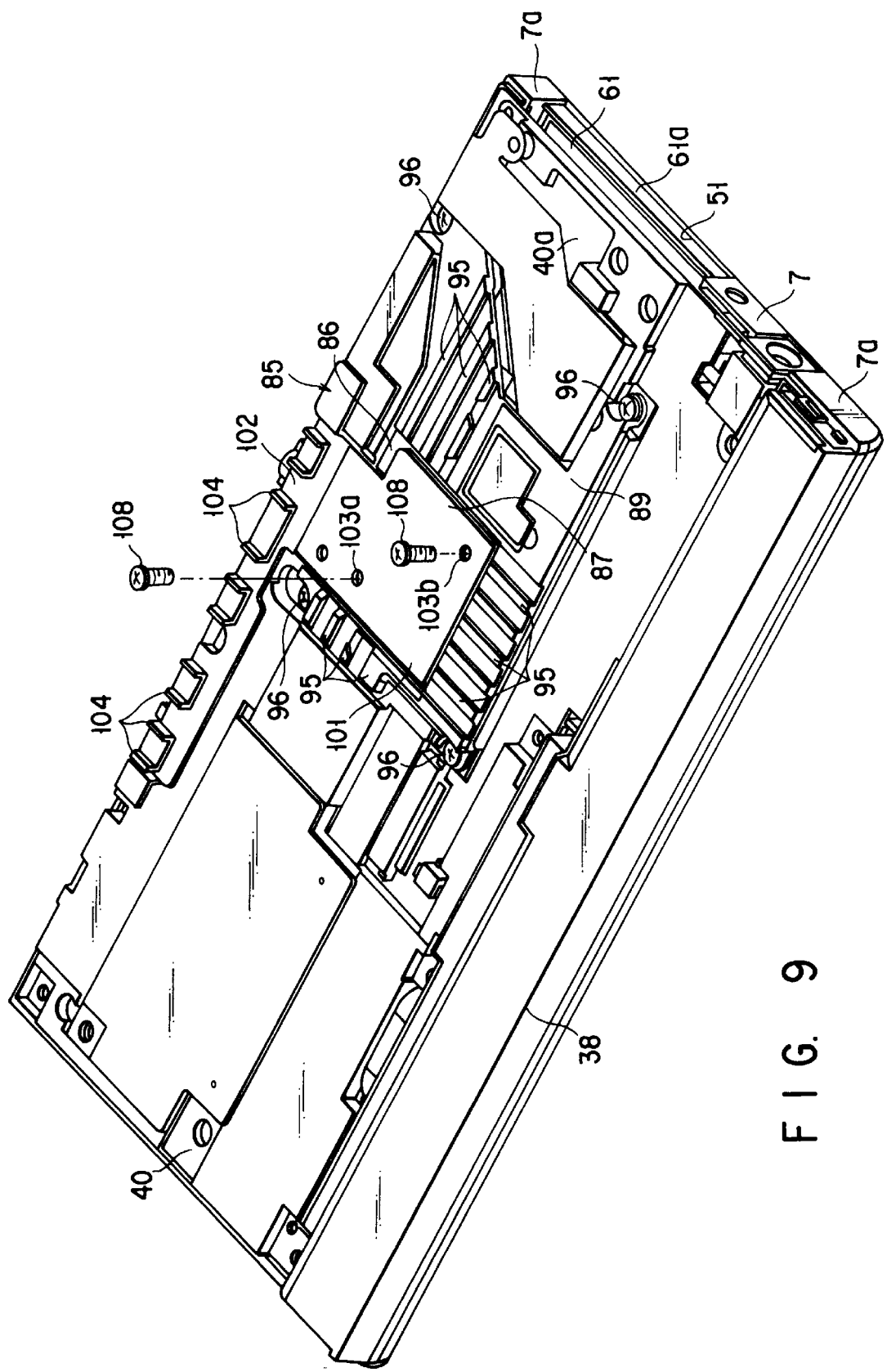
FIG. 9 is a perspective view, representing the positional relationship between the heat-radiating plate and the cold plate.

The first heat-conducting section 101 is square and has the same size as the heat-receiving section 88 of the cold plate 86. The section 101 has two holes 103a and 103b which are coaxial with the screw holes 94a and 94b of the cold plate 86. As shown in FIGS. 4 and 9, the second heat-radiating section 102 is shaped like a band, extending along the width of the housing 2. The section 102 has a plurality of heat-radiating projections 104 on its upper surface. The projections 104 are strips which extend along the depth of the housing 2. The projections 104 are arranged parallel, spaced apart in the widthwise direction of the housing 2.

The heat-dissipating plate 87 is secured to the lower surface of the top wall 4e by an adhesive tape (not shown). The plate 87 is so positioned that the first heat-conducting section 101 and the second heat-radiating section 102 are located in the opening 11a of the keyboard mount portion 11 and at the back of the mount portion 11, respectively.

As illustrated in FIG. 2, the first heat-conducting section 101 is positioned below the metal shield 20. The shield 20 has a square opening 106, through which the first heat-conducting section 101 is exposed. Two tongues 107a and 107b extend from diagonally opposing corners of the square opening 106, and are formed integral with the metal shield 20. The tongues 107a and 107b contact the upper surface of the first heat-conducting section 101. The tongues 107a and 107b have a hole each. The through holes of the tongues 107a and 107b are axially aligned with the holes 103a and 103b of the first heat-conducting section 101.

The first heat-conducting section 101 remains mounted on the upper surface of the heat-receiving section 88 as long as the upper housing 8 is coupled with the lower housing 7. As shown in FIG. 9, two screws 108 pass through the holes 103a 103b of the first heat-conducting section 101 and also through the holes of the tongues 107a and 107b and are set in the screw holes 94a and 94b of the cold plate 86. The first heat-conducting section 101 is thereby secured to the upper surface of the heat-receiving section 88. Heat-conducting paths are thereby formed, which extend from the heat-receiving section 88 to the second heat-radiating section 102. Passing through the tongues 107a and 107b of the shield plate 20, the screws 108 secure the shield plate 20 to the first heat-conducting section 101 of the heat-dissipating plate 87.

Figure 10:
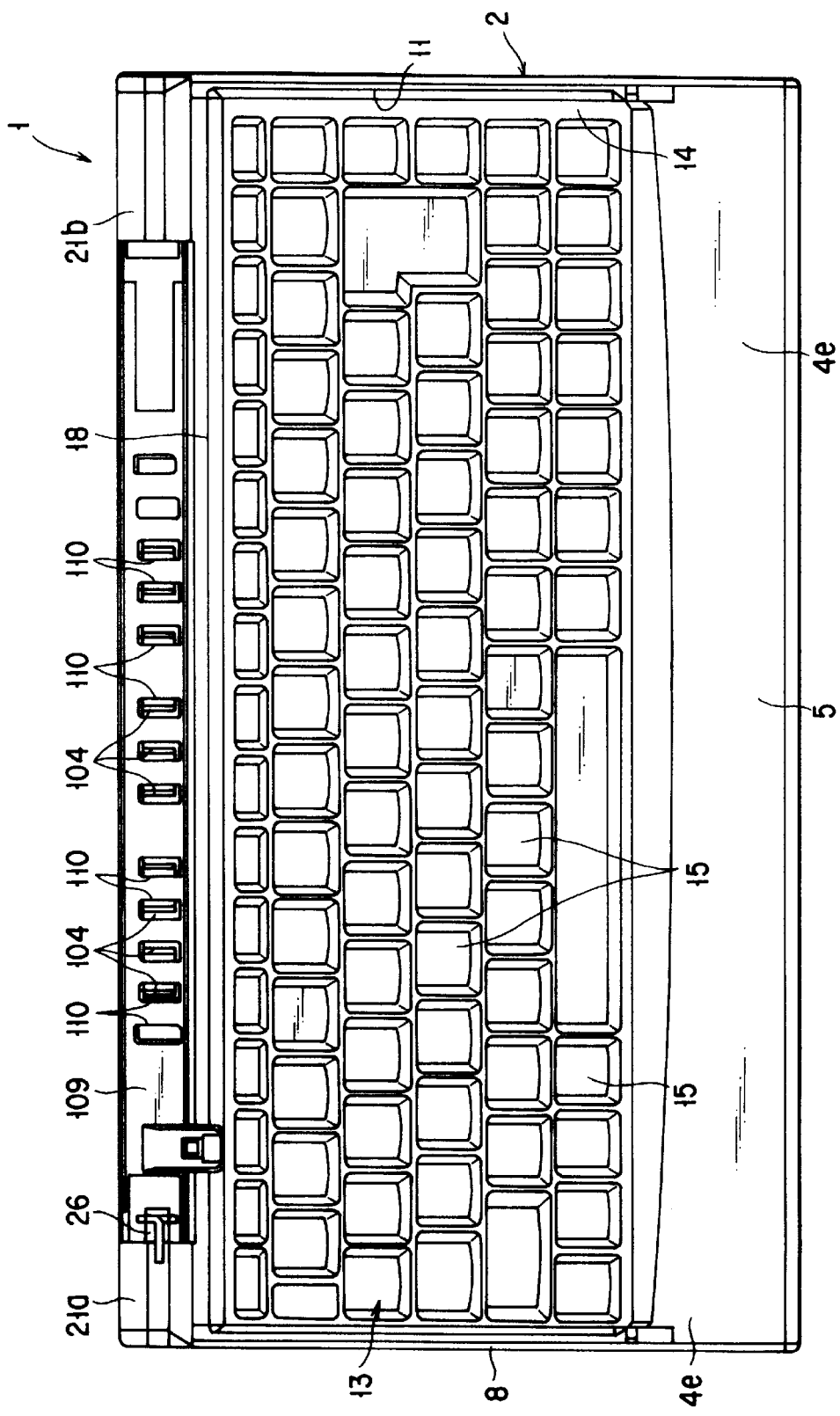
FIG. 10 is a plan view of the housing, depicting the positional relationship between the keyboard and the heat-radiating holes.

As shown in FIGS. 1 and 10, the top wall 4e of the upper housing 8 has a rear end portion 109. The rear end portion 109 is located at the back of the keyboard 13 and between the display-holding sections 21a and 21b. The portion 109 opposes the distal end part 25a of the coupling section 25 of the display housing 23 and is covered by the distal end part 25a, whichever position, including the closed and opened positions, the display unit 3 has been rotated to. The rear end portion 109 is curved, along the circle of curvature of the distal end part 25a, and is concaved toward the interior of the housing 2.

As shown in FIG. 3A, the rear end portion 109 of the top wall 4e is located right above the second heat-radiating section 102. As seen from FIG. 10, the rear end portion 109 has a number of heat-radiating holes 110. These holes 110 are slits, each extending along the depth of the upper housing 8. They are arranged in a row and between the display-holding sections 21a and 21b, spaced apart from one another in the widthwise direction of the upper housing 8. The heat-radiating holes 110 oppose to the distal end part 25a of the coupling section 25, whichever position, including the closed and opened positions, the display unit 3 has been rotated to. A gap 111 is provided between the distal end part 25a of the coupling section 25 and the rear end portion 109 of the top wall 4e. The gap 111 is too narrow to allow insertion of the fingertip of the operator. The gap 111 remains open at both the front and back of the housing 2, allowing a passage of air, while the display unit 3 stays in the opened position.

The projections 104 of the second heat-radiating section 102 are inserted in the heat-radiating holes 110, respectively. The tips of the projections 104 are concaved and exposed to the gap 111 through the heat-radiating holes 110. They are covered and concealed by the distal end part 25a of the coupling section 25, no matter whichever position, including the closed and opened positions, the display unit 3 has been rotated to.

While the computer 1 is operating, the IC chip 78 generates heat as the TCP 76 consumes electric power. Most of the heat is transmitted to the heat-receiving section 88. This because the IC chip 78 is contacts the elastic layer 93, which in turn contacts the heat-receiving section 88. The heat transmitted to the section 88 is dissipated to the heat-dissipating section 89 of the cold plate 86, because the section 89 extends from the section 88 along the upper surface 40a of the circuit board 40. Since the section 89 has a number of heat-radiating fins 95, the cold plate 86 has a large surface which contacts air. The cold plate 86 therefore radiates the heat from the entire circuit board 40 by natural air cooling.

The heat-receiving section 88 of the cold plate 86 contacts the first heat-conducting section 101 of the heat-dissipating plate 87. The first heat-conducting section 101 conducts the heat from the heat-receiving section 88 to the second heat-radiating section 102. As mentioned above, the second heat-radiating section 102 has a plurality of heat-radiating projections 104. The projections 104 are exposed in the gap 111 provided between the distal end part 25a of the coupling section 25 and the rear end portion 109 of the top wall 4e. The projections 104 are exposed to the air flowing through the gap 111. The heat conducted to the second heat-radiating section 102 is therefore radiated outwards from the housing 2. Hence, the heat emanating from the TCP 76 hardly accumulates in the housing 2. This enhances the efficiency of radiating heat from the TCP 76.

The projections 104 of the second heat-dissipating plate 87 are spaced apart in the widthwise direction of the housing 2. Hence, the heat generated by the IC chip 78 and transmitted to the second heat-radiating section 102 is radiated from the housing 2 at a plurality of positions spaced apart along the width of the housing 2. This prevents a temperature rise in a particular part of the rear end portion 109 of the top wall 4e.

As indicated above, air flows in the gap 111 provided between the distal end part 25a of the coupling section 25 and the rear end portion 109 of the top wall 4e. The layer of air functions as a heat-insulating barrier. The heat generated by the TCP 76 and transmitted to the gap 111 influences but a little on the display unit 3.

The heat-radiating fins 95 of the cold plate 86 contact the shield plate 20, which in turn contacts the reinforcing plate 16 of the keyboard 13. Therefore, the heat generated by the IC chip 78 and transmitted to the cold plate 86 is dissipated to the reinforcing plate 16 through the shield plate 20. Being larger than the cold plate 86, the shield plate 20 can diffuse the heat into the entire reinforcing plate 16. The heat would be concentrated in no part of the plate 16. The heat the IC chip 78 conducted to the cold plate 86 can be efficiently transmitted to the keyboard 13. That is, the heat can be radiated from the TCP 76 with high efficiency.

As described earlier, the TCP 76 is mounted on the circuit board 40 which is secured to the lower housing 7 by screws 41. Part of the heat the TCP 76 generates is dissipated through the circuit board 40 to the lower housing 7. The lower housing 7 made of metal which is superior to synthetic resin in thermal conductivity. Further, it is exposed to outside. The lower housing 7 can radiate heat efficiently. As a result, the heat generated by the TCP 76 hardly accumulates in the housing 2. The ambient temperature of the TCP 76 and the circuit board 40 therefore remains low.

Since the projections 104 of the heat-dissipating plate 87 are exposed outside the housing 2 through the heat-radiating holes 110 of the upper housing 8, no large space needs to be provided in the housing 2 to accommodate the projections 104. The housing 2 can be thin and compact. This contributes to the miniaturization of the computer 1.

The heat-radiating projections 104 remains covered by the distal end part 25a of the coupling section 25, no matter whichever position, including the closed and opened positions, the display unit 3 has been rotated to. Thus the coupling section 25 protects the heat-radiating projections 104. The operator never happens to touch the projections 104 or never get his or her finers burnt, while operating the keyboard 13 or holding the computer 1 with the display unit 3 set in the closed position.

Since the upper housing 8 is made of synthetic resin which is far less thermally conductive than metal, the temperature of the upper housing 8 does not rise. The heat generated by the TCP 76 is positively dissipated to the lower housing 7, rather than to the upper housing 8. The upper housing 8 does not become too hot for the operator to touch it when he or she operates the keyboard 13.

The present invention is not limited to the first embodiment described above. A portable computer according to the second embodiment of the invention will now be described, with reference to FIG. 11.

The second embodiment is so designed that the heat the TCP 76 generates is radiated from the display unit 3, too. It is identical to the first embodiment in basic structure. Therefore, the components identical or similar to those of the first embodiment are designated at the same reference numerals in FIG. 11 and will not be described in detail.

As seen from FIG. 11, the second heat-radiating section 102 of the heat-dissipating plate 87 has an integral extension 200. The extension 200 is located below the rear end portion 109 of the top wall 4e and extends toward the left side of the housing 2. The distal end of the extension 200 is positioned below the left display-holding section 21a of the housing 2 and is fastened by screws 41 to the first bracket 28 of the hinge device 26. Hence, the heat-dissipating plate 87 contacts the hinge device 26.

The housing 23 of the display unit 3 incorporates an auxiliary heat-radiating plate 201. The plate 201 is made of metal having high thermal conductivity, such as aluminum alloy or copper-based alloy. The auxiliary heat-radiating plate 201 is provided in the coupling section 25 of the display housing 23 and extends in the widthwise direction of the display housing 23. The auxiliary heat-radiating plate 201 has an auxiliary heat-radiating section 202. The section 202 extends along the distal end part 25a of the coupling section 25 and has a plurality of heat-radiating projections 203. The projections 203 extend toward the distal end part 25a of the section 25 and are spaced apart in the widthwise direction of the display housing 23.

The auxiliary heat-radiating plate 201 has a support 204 at its left edge. The support 204 is bent at the right angle, extending upwards, and fastened to the second bracket 29 of the hinge device 26. Hence, the hinge device 26 connects the heat-dissipating plate 87 of the housing 2 to the auxiliary heat-radiating plate 201 provided in the display unit 3. The device 26 and the plates 87 and 201 constitute a heat transmitting path which connects the interiors of the housing 2 and display housing 23.

The distal end part 25a of the coupling section 25 has a plurality of heat-radiating holes 205. The holes 205 are spaced apart from one another along the width of the display housing 23. They communicate with the gap 111 which is provided between the distal end part 25a of the coupling section 25 and the rear end portion 109 of the top wall 4e. Inserted in the holes 205 are the heat-radiating projections 203 of the auxiliary heat-radiating plate 201. The tips of the projections 203 are exposed to the gap 111 through the heat-radiating holes 205.

As FIG. 11 shows, the display housing 23 contains an inverter circuit 207. The inverter circuit 207 comprises a circuit board 208 and various circuit components 209. The circuit board 208 is fastened to the LCD cover 31 at the left side of the color liquid crystal display 24. The circuit components 209 are mounted on the circuit board 208. Among the components 209 has a component 209a which generates heat while operating. The circuit components 209a is located near the second bracket 29 of the hinge device 26. The component 209a is connected to the second bracket 29 by a heat-conducting member 211. The heat-conducting member 211 is made of metal having high thermal conductivity, such as aluminum alloy or copper-based alloy. The member 211 conducts the heat generated by the component 209a to the second bracket 29.

While the computer 1 is operating, the TCP 76 generates heat. The heat is transmitted to the heatsink 85 and radiated outwards from the housing 2 through the heat-radiating projections 104 of the heatsink 85, in the same way as in the first embodiment. The heat-dissipating plate 87 of the heatsink 85 has its extension 200 connected to the hinge device 26. The hinge device 26 is connected to the auxiliary heat-radiating place 201 of the display housing 23. Hence, part of the heat conducted to the heat-dissipating plate 87 is transmitted from the extension 200 to the auxiliary heat-radiating plate 201 by the way of the hinge device 26. The plate 201 has heat-radiating projections 203, which are exposed to the gap 111 through the heat-radiating holes 205 of the display housing 23. The heat transmitted to the plate 201 is radiated outwards from the display housing 23 through the heat-radiating projections 203.

While the computer 1 is operating, the circuit components 209a of the inverter circuit 207 also generates heat. The heat generated by the component 209a is conducted via the heat-conducting member 211 to the second bracket 29 of the hinge device 26. The heat is then dissipated to the auxiliary heat-radiating plate 201. The heat generated by the component 209a is radiated from the display housing 23 also through the projections 203 of the auxiliary heat-radiating plate 201. The heat hardly accumulates in the display housing 23.

Part of the heat the TCP 76 has generated is dissipated from the heatsink 85 to the auxiliary heat-radiating plate 201 provided in the display housing 23. The heat is then radiated from the housing 23 through the heat-radiating projections 203 of the plate 201. Diffused to the entire display housing 23, the heat generated by the TCP 76 can be radiated at high efficiency.

A portable computer according to the third embodiment of the invention will now be described, with reference to FIG. 12. The third embodiment is characterized in that the heat emanating from the TCP 76 provided in the housing 2 is radiated from the display housing 23. The third embodiment is identical to the first embodiment in basic structure. The components identical or similar to those of the first embodiment are, therefore, designated at the same reference numerals in FIG. 12 and will not be described in detail.

Figure 12:
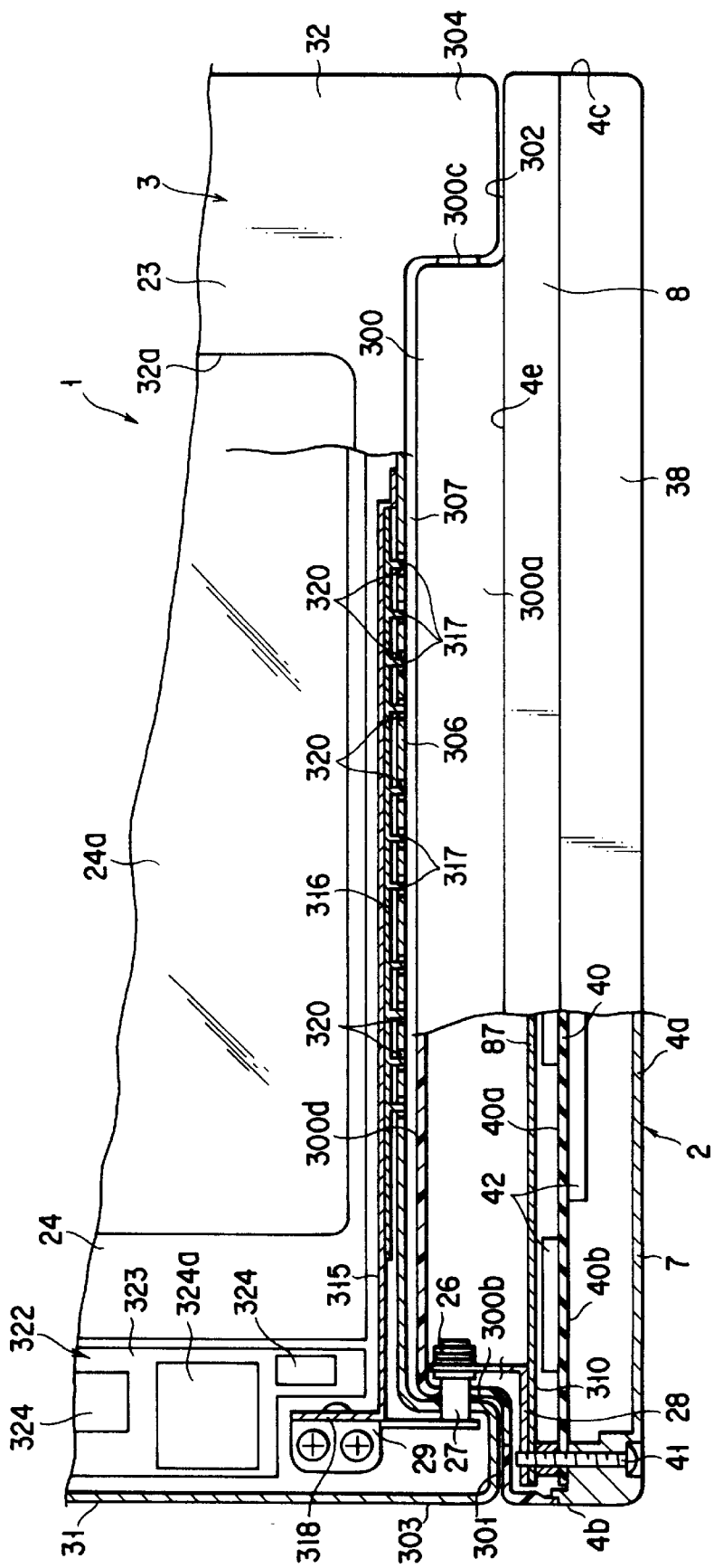
FIG. 12 is a sectional view of a portable computer according to a third embodiment of the invention.

As shown in FIG. 12, the housing 2 has a hollow projection 300 which is formed integral with the top wall 4e. The projection 300 is shaped like a long box, extending in the widthwise direction of the housing 2. The projection 300 comprises a front wall 300a, left side wall 300b, right side wall 300c, top wall 300d and rear wall (not shown). The front wall 300a and the side walls 300b and 300c are connected to and extend upward from the top wall 4e of the housing 2. The top wall 300d is connected to the upper edges of the front wall 300a, the side walls 300b and 300c and the rear wall (not shown) and extends horizontally in parallel to the top wall 4e of the housing 2.

The housing 2 has a pair of display supports 301 and 302, which are positioned at the left and right edge portions of the top wall 4e. Both display supports 301 and 302 are provided on the rear end of the housing 2.

The display housing 23 has a pair of legs 303 and 304. The legs 303 and 304 are set apart from each other along the width of the display housing 23. The legs 303 and 304 project into the display supports 301 and 302 of the housing 2, respectively. The left leg 303 is rotatably coupled to the housing 2 by the hinge device 26.

The display housing 23 has a bottom wall 306. The bottom wall 306 opposes the front wall 300a of the hollow projection 300 while the display unit 3 remains rotated to the closed position. While the display unit 3 stays in the opened position, the bottom wall 306 opposes the top wall 300d of the projection 300. The bottom wall 306 defines a gap 307, jointly with the projection 300. Air flows into the gap 307 from outside the display unit 3. More precisely, the gap 307 is formed between the bottom wall 306 and the front wall 300a of the projection 300 while the display unit 3 remains in the closed position, and between the bottom wall 306 and the top wall 300d of the projection 300 while the display unit 3 remains in the open position. The gap 307 is too narrow to allow insertion of the fingertip of the operator.

As illustrated in FIG. 12, the heat-radiating plate 87 has an extension 310. The extension 310 is located below the hollow projection 300 of the housing 2 and extends toward the left side of the housing 2. The distal end of the extension 310 is positioned below the left display-holding section 301 of the housing 2 and is fastened by screws 41 to the first bracket 28 of the hinge device 26. Hence, the heat-dissipating plate 87 contacts the hinge device 26.

The display housing 23 of the display unit 3 incorporates a heat-radiating plate 315. The plate 315 is made of metal having high thermal conductivity, such as aluminum alloy or copper-based alloy. The heat-radiating plate 315 extends along the bottom wall 306 of the display housing 23, or in the widthwise direction of the display housing 23. The heat-radiating plate 315 has a heat-radiating section 316. The section 316 opposes the bottom wall 306 of the display housing 23 and has a plurality of heat-radiating projections 317. The projections 317 extend toward the bottom wall 306 and are spaced apart in the widthwise direction of the display housing 23.

The heat-radiating plate 315 has a support 318 at its left end. The support 318 is bent at right angle, extending upwards, and connected to the second bracket 29 of the hinge device 26. Hence, the hinge device 26 connects the heat-dissipating plate 87 of the housing 2 to the heat-radiating plate 315 provided in the display unit 23. The device 26 and the plates 87 and 315 constitute a heat transmitting path which connects the interiors of the housing 2 and display housing 23.

The bottom wall 306 of the display housing 23 has a plurality of heat-radiating holes 320. The holes 320 are spaced apart along the width of the display housing 23. They open to the gap 307 described above. The heat-radiating projections 317 of the plate 315 are inserted in the heat-radiating holes 320, respectively. The tips of the projections 317 are exposed to the gap 307 via the heat-radiating holes 320.

As seen from FIG. 12, the display housing 23 contains an inverter circuit 322. The inverter circuit 322 comprises a circuit board 323 and various circuit components 324. The circuit board 323 is fastened to the LCD cover 31 at the left side of the color liquid crystal display 24. The circuit components 324 are mounted on the circuit board 323. Among the components 324 has a component 324a which generates heat while operating.

While the computer 1 is operating, the heat the TCP 76 generates is conducted to the heat-radiating plate 315 through the heat-radiating plate 87 and the hinge device 26. As indicated above, the projections 317 of the heat-radiating section 316 of the heat-radiating plate 315 are exposed outside through the heat-radiating holes 320 of the display housing 23. The projections 317 are therefore exposed to the air flowing through the gap 307. The heat conducted to the heat-radiating plate 315 is therefore radiated outwards from the display housing 23. Thus, the heat emanating from the TCP 76 is transmitted from the housing 2 to the display housing 23 and is radiated from the computer 1. The heat hardly accumulates in the housing 2.

As mentioned above, the heat-radiating projections 317 of the plate 315 are spaced apart from one another in the widthwise direction of the display housing 23. Therefore, the heat generated by the TCP 76 and transmitted to the heat-radiating plate 315 is radiated from the display housing 23 at a plurality of positions spaced apart along the width of the display housing 23. This prevents a temperature rise in a particular part of the bottom wall 306.

Since the heat-radiating projections 317 of the plate 315 are exposed outside the display housing 23 through the heat-radiating holes 320 of the housing 23, the housing 23 need not have a space for accommodating the heat-radiating projections 317. The display housing 23 can be thin and compact. This contributes to the miniaturization of the computer 1.

The heat-radiating projections 317 of the plate 315 oppose the front wall 300a of the projection 300 of the housing 2 while the display unit 3 remains in the closed position. The projections 317 oppose the top wall 300d of the housing 2 while the display unit 3 remains in the opened position. Hence, the projection 300 protects the heat-radiating projections 317. The operator never happens to touch the heat-radiating projections 317 or get his or her finers burnt, while operating the keyboard 13 or holding the computer 1 with the display unit 3 set in the closed position.

Figure 13:
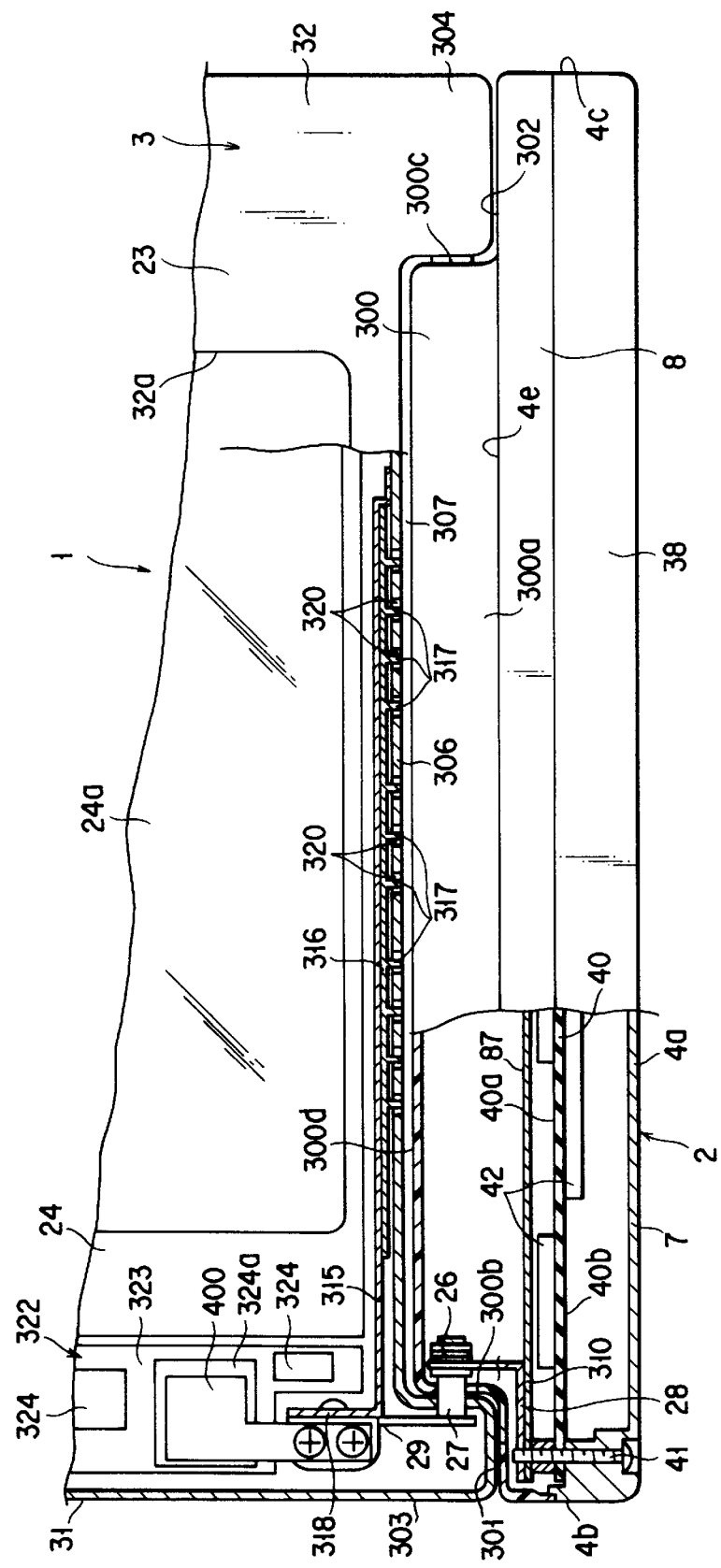
FIG. 13 is a sectional view of a portable computer according to a fourth embodiment of the invention.

A portable computer which is the fourth embodiment of the invention will be described, with reference to FIG. 13. The fourth embodiment is a modification of the third embodiment and is identical thereto in terms of basic structure. In the fourth embodiment, the circuit component 324a which generates heat while appearing is connected to the second bracket 29 by a heat-conducting member 400. The member 400 is made of metal having high thermal conductivity, such as aluminum alloy or copper-based alloy. Made or such metal, the member 400 conducts the heat generated by the component 324a to the second bracket 29, from which the heat is transmitted to the heat-radiating plate 315.

While the computer 1 is operating, the circuit components 324a of the inverter circuit 322 generates heat. The heat generated by the component 324a is conducted via the heat-conducting member 400 to the second bracket 29 of the hinge device 26. The heat is then dissipated to the heat-radiating plate 315. The heat generated by the component 324a is radiated from the display housing 23 through the projections 317 of the heat-radiating plate 315. The heat hardly accumulates in the display housing 23.

A portable computer according to the fifth embodiment of the invention will be described, with reference to FIGS. 14A and 14B. The fifth embodiment is identical to the first embodiment, except for the structure of the housing 2. The components identical or similar to those of the first embodiment are, therefore, designated at the same reference numerals in FIGS. 14A and 14B and will not be described in detail.

Both the upper housing 500 and the lower housing 7 of the housing 2 shown in FIG. 14A are made of metal having high thermal conductivity, such as aluminum alloy or copper-based alloy. Namely, the whole housing 2 is made of metal and can radiate heat efficiently.

Those parts of the upper housing 500 which the operator is likely to touch, more precisely the palm rest 5 and the keyboard mount portion 11, are covered with a protective layer 501 which has heat-insulating property. The protective layer 501 is made of a synthetic resin which is elastic and which is pleasant to the touch.

Since the housing 2 is entirely made of metal excellent in thermal conductivity and almost every part of it is exposed outside, it can efficiently radiate the heat naturally emanating from the heatsink 85 and the heat dissipated via the circuit board 40. As a result, the heat generated by the TCP 76 hardly accumulates in the housing 2.

The housing 2, to which heat is efficiently conducted from the heat sink 85, functions as a heatsink. Therefore, the heatsink 85 mounted on the circuit board 40 need not be large. It is unnecessary to provide a large space in the housing 2, in order to accommodate the heatsink 85. The housing 2 can be thin and compact.

As indicated above, the palm rest 5 which the operator is likely to touch is covered with the protective layer 501. Having heat-insulating property, the protective layer 501 does not get too hot to touch, though the housing 2 is wholly made of metal to radiate heat efficiently. Therefore, the operator does not feel hot while operating the keyboard 13, with his or her palms resting on the palm rest 5.

The circuit component which generates heat while operating is not limited to a TCP. Rather, it may be of any other type of an LSI package.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. An information apparatus comprising:

a housing having a top wall;

input means supported by said top wall, for inputting information;

a display unit which has a coupling section located proximate an end of said input means and is supported on said housing and which is rotatable between a closed position, where the display unit covers said top wall and said input means, and an opened position, where the display unit exposes said top wall and said input means;

a circuit component which is incorporated in said housing and which generates heat while operating; and a heatsink incorporated in said housing, for radiating the heat generated by said circuit component, said heatsink having a heat-radiating section exposed along said top wall and opposing said coupling section of said display unit when the display unit has been rotated between and including said opened and closed positions.

2. The information apparatus according to claim 1, wherein the coupling section of said display unit defines a gap jointly with a rear part of said top wall, and the heat-radiating section of said heatsink is cooled with air flowing through said gap.

3. The information apparatus according to claim 2, wherein the rear part of said top wall has a plurality of heat-radiating holes spaced apart in a widthwise direction of said housing, and the heat-radiating section of said heatsink has a plurality of heat-radiating projections inserted in said heat-radiating holes.

4. The information apparatus according to claim 3, wherein said housing comprises a lower housing made of metal and having a bottom wall and an upper housing made of synthetic resin, connected to the lower housing and including said top wall.

5. The information apparatus according to claim 4, further comprising a circuit board mounted on the bottom wall of said lower housing, and said circuit component is mounted on the circuit board.

6. The information apparatus according to claim 5, wherein said heatsink comprises a heat-receiving plate supported by said circuit board, for receiving heat emanating from said circuit component, and a heat-dissipating plate supported by said upper housing and including said heat-radiating projections, said heat-receiving plate and said heat-dissipating plate remaining in mutual contact as long as the lower housing and said upper housing are connected to each other.

7. The information apparatus according to claim 2, wherein said display unit comprises a display housing including said coupling section, a liquid crystal display incorporated in the display housing and an auxiliary heat-radiating plate provided in said coupling section, and is rotatably coupled to said housing by means of a hinge device made of metal, the hinge device has a first bracket incorporated in said housing and contacting said heatsink and a second bracket incorporated in said display housing and contacting said auxiliary heat-radiating plate, and said auxiliary heat-radiating plate has an auxiliary heat-radiating section exposed outside said coupling section.

8. The information apparatus according to claim 7, wherein said auxiliary heat-radiating section opposes the rear part of said top wall while said display unit remains at the opened position.

9. The information apparatus according to claim 8, wherein said coupling section has a plurality of heat-radiating holes spaced apart in a widthwise direction of said display housing, and said auxiliary heat-radiating section has a plurality of heat-radiating projections inserted in the heat-radiating holes of said coupling section.

10. The information apparatus according to claim 7, wherein said display unit has a circuit component which is incorporated in said display housing, which generates heat while operating and which is connected to said second bracket by a heat-conducting member.

11. The information apparatus according to claim 1, wherein said top wall has a keyboard mount portion having an opening which allows an access into said housing, said input means is a keyboard mounted on the keyboard mount portion and comprising a panel made of synthetic resin and covering said opening, a number of keys arranged on an upper surface of the panel and a reinforcing plate made of metal and covering a lower surface of the panel, and said heatsink contacts the reinforcing plate.

12. The information apparatus according to claim 11, wherein said housing has a shield plate made of metal, provided on said keyboard mount portion, being larger than said heatsink and clamped between said heatsink and said reinforcing plate.

13. An information apparatus comprising:
a housing having a top wall;
a keyboard mounted on said top wall;
a display unit which has a coupling section located at the back of said keyboard and connected to said housing and which is rotatable between a closed position where the display unit covers said top wall and said keyboard and an opened position where the display unit exposes said top wall and said keyboard, said coupling section opposing a rear part of said top wall when the display unit has been rotated between and including said opened and closed positions;
a circuit board incorporated in said housing;
a circuit component which is mounted on said circuit board and which generates heat while operating; and
a heatsink incorporated in said housing, for radiating the heat generated by said circuit component;
wherein said housing comprises a lower housing made of metal and supporting said circuit board and an upper housing made of synthetic resin, connected to the lower housing and including said top wall, and said heatsink has a heat-radiating section exposed along the rear part of said top wall and opposing said coupling section of said display unit and spaced apart therefrom by a gap.

14. The information apparatus according to claim 13, wherein the heat-radiating section of said heatsink is cooled with air flowing through said gap.

15. The information apparatus according to claim 14, wherein said top wall has a plurality of heat-radiating holes spaced apart in a widthwise direction of said housing, and the heat-radiating section of said heatsink has a plurality of heat-radiating projections inserted in said heat-radiating holes.

16. The information apparatus according to claim 13, wherein the top wall of said housing includes a hollow projection having a front wall and a top wall which is connected to an upper end of the front wall, and said heat-radiating member opposes the front wall of said projection while said display unit remains in the closed position and opposes the top wall of said projection while said display unit remains in the opened position.

17. An information apparatus comprising:
a housing having a top wall;
operation means supported by said top wall;
a circuit component which is incorporated in said housing and which generates heat while operating;
a display unit having a display housing and a liquid crystal display incorporated in the display housing, supported by said housing and rotatable between a closed position where the display unit covers said top wall and said operation means and an opened position where the display unit exposes said top wall and said operation means;
a heat-radiating member provided in said display housing; and
heat-conducting means for conducting heat from said circuit component to said heat-radiating member;
wherein said heat-radiating member having a heat-radiating section exposed along said display housing, said heat-radiating section opposing said top wall when the display unit has been rotated between and including said opened and closed positions.

18. The information apparatus according to claim 17, wherein said heat-conducting means comprises a heatsink provided in said housing, for receiving heat generated by said circuit component, and a hinge device made of metal and rotatably connecting said display housing to said housing, said hinge device comprising a first bracket incorporated in said housing and contacting said heatsink and a second bracket incorporated in said display housing and contacting said heat-radiating member.

19. The information apparatus according to claim 18, wherein said display unit has a circuit component which is incorporated in said display housing, which generates heat while operating and which is connected to said second bracket by a heat-conducting member.

20. The information apparatus according to claim 17, wherein said display housing has a plurality of heat-radiating holes spaced apart in a widthwise direction of said display housing, and said heat-radiating section has a plurality of heat-radiating projections inserted in said heat-radiating holes.

\* \* \* \* \*